Feb. 28, 1961  G. R. WHITELEY  2,973,237
GRAPHICAL RECORDER MARKING PEN
Filed April 25, 1957

INVENTOR.
GLENN R. WHITELEY
BY Robert H. Fraser
ATTORNEY

United States Patent Office 2,973,237
Patented Feb. 28, 1961

2,973,237

GRAPHICAL RECORDER MARKING PEN

Glenn R. Whiteley, Pasadena, Calif., assignor to F. L. Moseley Co., a corporation of California Filed Apr. 25, 1957, Ser. No. 655,145

1 Claim. (Cl. 346—29)

This invention relates to graphical recorders and more particularly to an improved marking pen mechanism for use in a graphical recorder.

In graphical recorders of the type in which a graph is plotted on a recording surface, there must be provided a reliable and accurate marking element for drawing a line representing the relationship between the variables being plotted. Both conventional liquid ink pens and ball type pens are generally not well suited for use as marking elements in graphical recorders due to a lack of reliability and accuracy in drawing a line at various speeds and in various directions.

Accordingly, it is an object of the present invention to provide a new and improved marking pen for use in a graphical recorder which is capable of accurately and reliably drawing a line.

It is another object of the present invention to provide a new and improved marking pen for use in a graphical recorder which is capable of being selectively engaged and disengaged from a recording medium.

It is still another object of the present invention to provide a new and improved marking pen and ink reservoir for use in a graphical recorder which is capable of reliable operation for extended periods.

Briefly, the invention includes a pen for use in a graphical recorder having a reservoir tank, a capillary tube which extends into the reservoir tank, a pen tip which is attached to one end of the capillary tube for drawing a line on a recording surface, and means for suspending the reservoir tank so that the pen tip may be engaged and disengaged from a recording medium.

A better understanding of the present invention may be had from reading of the following specification and an inspection of the drawing, in which.

Figure 1:
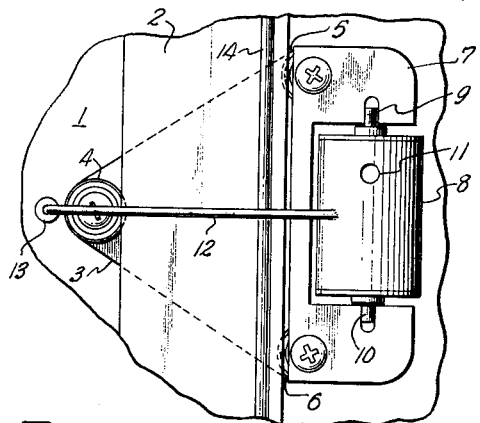
Fig. 1 is a plan view of a pen mechanism constructed in accordance with the present invention along with a portion of a graphical recorder.

In Fig. 1 there is shown a portion of a graphical recorder which includes a bed or recording surface 1 upon which may be placed a recording medium such as a piece of graph paper. Extending across the recording bed 1 is a carriage 2 only a portion of which is shown. A pen carrier is supported by the carriage 2 for travel along the length of the carriage 2. The pen carrier includes a plate 3 which rides beneath the carriage 2 with the wheels 4, 5 and 6 riding in grooves along the sides of the carriage 2.

Attached to the top of the wheels 5 and 6 is a tank supporting plate 7 which may be held in place by conventional machine screws as shown. The plate 7 is U-shaped for receiving a cylindrical tank 8 which is supported upon a pair of trunnions comprising the end pins 9 and 10 which extend into slots cut in the tank supporting plate 7. The tank 8 includes a hole 11 through which the tank 8 may be filled with liquid ink.

Extending across the carriage 2 above the wheel 4 is a capillary tube 12 which extends within the tank 8. By capillary action, the tube 12 draws ink from the tank 8 up and over the carriage 2 and feeds the ink to a pen point 13 attached to the end of the capillary tube 12. A pen lift bar, which extends along the length of the carriage 2, may be raised and lowered from a solenoid (not shown). A mechanism for actuating the lift bar 14 is shown and described in my co-pending United States patent application entitled "Graphical Recorder Marking Element Mechanisms," Serial No. 634,456, filed January 16, 1957, and now abandoned.

By raising and lowering the lift bar 14 the tank 8 turns on the pins 9 and 10 and the capillary tube 12 raises and lowers to engage and disengage the pen point 13 from the recording medium on the bed 1.

Figure 2:
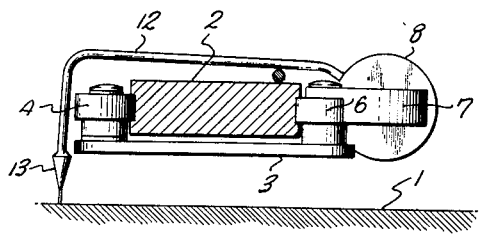
Fig. 2 is an elevational view of the mechanism of Fig. 1.
Figure 3:
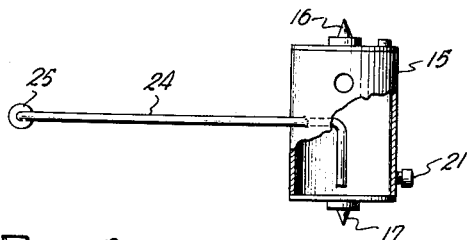
Fig. 3 is a plan view of a pen constructed in accordance with a second embodiment of the invention.
Figure 4:
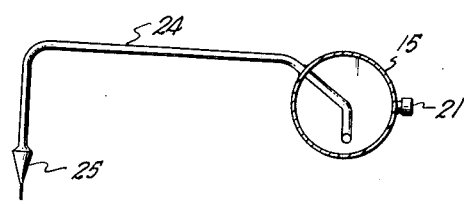
Fig. 4 is an elevational view of the pen of Fig. 3 with one end of the reservoir tank removed.
Figure 5:
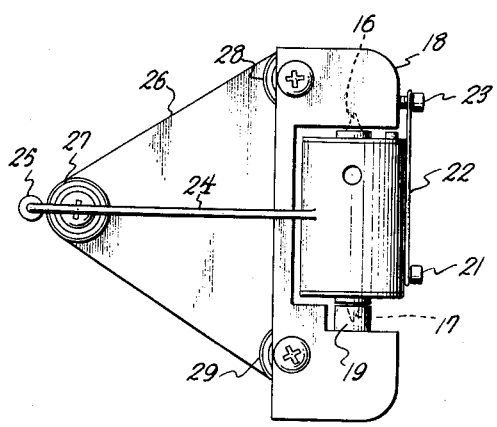
Fig. 5 is a plan view of a pen mechanism constructed in accordance with the second embodiment of the invention.
Figure 6:
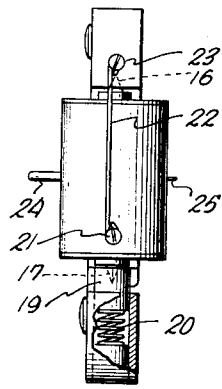
Fig. 6 is a right end view of the apparatus of Fig 5 partially broken away.

The apparatus of Figs. 1 and 2 is well suited for use in a graphical recorder which has a substantially horizontal bed 1. Figs. 3–6 illustrate an alternative embodiment of the invention which may be used where the bed of the recorder is vertical. The pen of Figs. 3–6 includes a cylindrical tank 15 which is substantially similar to the cylindrical tank 8 of Figs. 1 and 2. At the ends of the cylindrical tank 15 a pair of trunnion pins 16 and 17 are shaped in the form of cones to engage a supporting plate 18 (Fig. 5). The pin 16 engages a correspondingly shaped bearing in one arm of the plate 18 while the pin 17 of the pen engages a spring loaded bearing support 19 which is thrust inwardly from the other arm of the tank support plate 18 by means of a spring 20 (Fig. 6).

Where the recording surface is substantially horizontal, as in the case of the pen of Figs. 1 and 2, the action of gravity on the capillary tube 12 and pen point 13 holds the pen point 13 in engagement with the surface. However, where the pen is for use in drawing a line on a vertical surface, a spring 22 (Figs. 5 and 6) may be attached between a spring mount 21 on the tank 15 and a fixed pin 23 on the tank support plate 18 to urge the pen point 13 into contact with the recording surface.

Extending outwardly from the tank 15 is a tube 24 which functions as a capillary tube in a manner similar to the tube 12 described above with respect to Figs. 1 and 2. At the outer end of the tube 24 is a pen point 25 which may be substantially similar to the pen point 13 of Figs. 1 and 2. However, the tank end of the tube is bent in the configuration shown in the broken away portion of Fig. 3 so as to reach into the lowest part of the tank when the pen is being used to write upon a vertical surface.

The reservoir supporting plate 18 may be attached to a triangular pen carrying plate 26 which is substantially identical to the plate 3 of Figs. 1 and 2 which in turn is adapted to travel along the length of a carriage (not shown) on the wheels 27, 28 and 29.

Through the use of the new and improved pen of the invention in a graphical recorder, a high degree of reliability in drawing a line or curve is realized over a wide range of speed of travel of the pen in any direction. The fineness of the pen point enables graphs to be made having a high degree of accuracy. In addition, with the relatively heavy ink reservoir tank supported apart from the pen point, the pen point is capable of following irregularities in the surface and may be easily lifted from the surface when no line is to be drawn.

What is claimed is:

A graphical recorder marking element mechanism for use in a two axis recorder including the combination of a recorder bed for supporting a record medium, a movable carriage, a carrier plate positioned between the carriage and the recorder bed, a plurality of wheels attached to the carrier plate and engaging the carriage to allow the carrier plate to be moved along the length of the carriage, a cylindrical ink reservoir tank, a pair of axial trunnion pins attached to the ends of the cylindrical ink reservoir tank, a tank supporting plate attached to the carrier plate, a first and a second bearing support on the tank supporting plate engaging the trunnion pins to support the ink reservoir tank on one side of the carriage, at least one of the bearing supports being provided with first spring loading means, a capillary tube inserted in the top of the ink reservoir tank and extending over the carriage so that ink drawn from the tank flows from one side of the carriage to the other, a pen point supported by the capillary tube on a side of the carriage opposite from the ink reservoir tank for engaging a record medium on the recorder bed to trace the movement of the carriage and the carrier plate, second spring loading means connected between the tank supporting plate and the cylindrical ink reservoir tank for urging the pen point into engagement with a record medium, and a lift bar positioned between the capillary tube and the carriage for raising the capillary tube and rotating the ink reservoir tank on the trunnion pins to disengage the pen point from the record medium.

References Cited in the file of this patent

UNITED STATES PATENTS

| | | |
|---|---|---|
| 1,489,782 | Newell | Apr. 8, 1924 |
| 1,847,918 | Blanchard | Mar. 1, 1932 |
| 2,199,078 | Lindemann | Apr. 30, 1940 |
| 2,655,426 | Barnes | Oct. 13, 1953 |
| 2,673,138 | Bartley et al. | Mar. 23, 1954 |
| 2,727,308 | Kuhn et al. | Dec. 20, 1955 |
| 2,775,502 | Sykora | Dec. 25, 1956 |